W. BARTHOLOMEW.
HEAT PREVENTION MEANS FOR EXTRACTORS.
APPLICATION FILED NOV. 3, 1917.
1,346,873. Patented July 20, 1920.
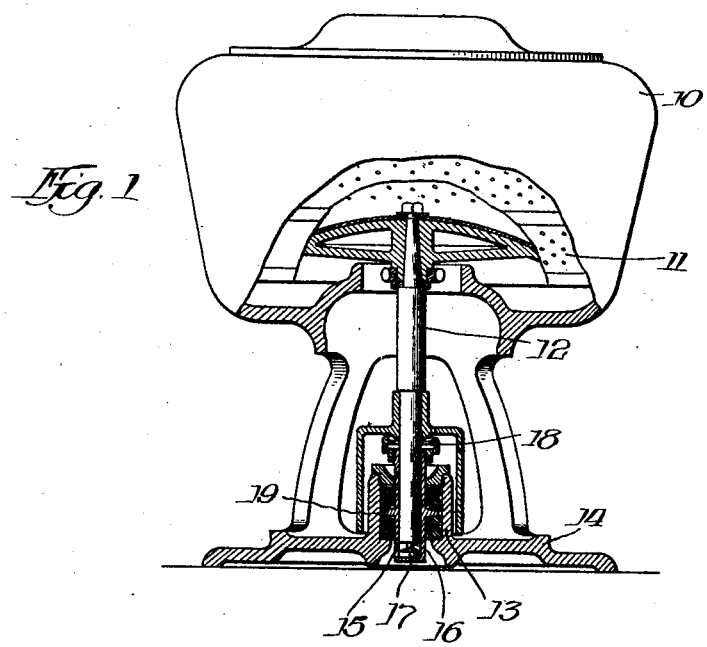
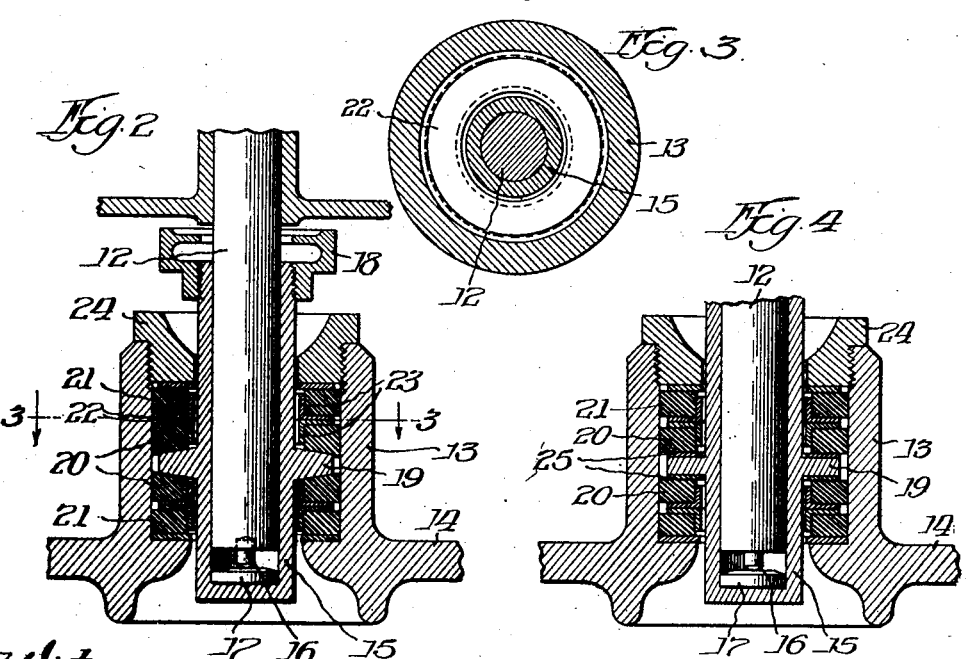
Witnesses:
Inventor
William Bartholomew
By Wilkinson & Huxley
Attys

UNITED STATES PATENT OFFICE.

WILLIAM BARTHOLOMEW, OF CHICAGO, ILLINOIS, ASSIGNOR TO TROY LAUNDRY MACHINERY CO., LTD., OF CHICAGO, ILLINOIS, A CORPORATION OF NEW YORK.

HEAT-PREVENTION MEANS FOR EXTRACTORS.

1,346,873.  Specification of Letters Patent.  Patented July 20, 1920.

Application filed November 3, 1917. Serial No. 200,028.

*To all whom it may concern:*

Be it known that I, WILLIAM BARTHOLOMEW, a citizen of the United States, and resident of Chicago, in the county of Cook and State of Illinois, have invented certain new and useful Improvements in Heat-Prevention Means for Extractors, of which the following is a specification.

This invention relates to heat prevention means for centrifugal extractors.

One of the objects of the invention is to maintain a relatively low bearing temperature.

Another object is to permit a relative movement between the bearing members and at the same time keep the bearing temperature at a minimum.

Generally speaking, these and other objects are accomplished by providing, in a centrifugal extractor, the combination of a spindle, a bearing bushing therefor having a laterally extending flange, a bearing member associated with said flange to take up gyratory motion, and heat resisting means associated with said bearing member and an adjacent element to permit relative movement therebetween with a minimum amount of friction.

The invention is illustrated on the accompanying sheet of drawings, in which—

Figure 1 is a side elevation, parts being in section, of a centrifugal extractor embodying my invention;

Fig. 2 is an enlarged detail sectional view of the spindle bearing mechanism;

Fig. 3 is a sectional view taken in the plane of line 3—3 of Fig. 2; and,

Fig. 4 is a sectional view similar to that shown in Fig. 2, showing a modification of my invention.

The various novel features of my invention will be apparent from the following description and drawings and will be particularly pointed out in the appended claims.

My invention is illustrated in connection with a centrifugal hydro extractor 10 having a perforated basket 11 secured to the upper end of a spindle 12, the lower end of which is mounted within a recessed portion 13 formed in the base 14 of the curb. The lower end of the spindle 12 rotates in the bearing bushing 15 and is provided with any suitable stepped bearing 16 having a curved surface rotating upon a stationary step 17 located in the bottom closed end of the bushing 15. The top of the bushing is provided with any suitable oiling device 18, and intermediate the ends of the bushing it has an integrally formed laterally extending flange 19, the upper and lower sides of which converge outwardly and engage coöperating bearing surfaces of bearing members 20. Each of the bearing members 20, which is in the form of a ring or annular piece of material, such as rubber or similar material, has a mating bearing member 21 which is spaced from its coöperating bearing member 20 by laterally extending flanges 22 of coöperating metal rings 23. These metal rings, four in number, two being located between each pair of bearing members above and below the bushing flange 19, have an inside diameter sufficiently greater than the outside diameter of the bearing bushing 15 to permit gyratory motion of a considerable degree. At the same time the metal rings 23 prevent the bearing members 20 and 21 coming in contact with the bearing bushing 15, thereby providing means whereby currents of air may be circulated between the bearing bushing 15 and the bearing members 20 and 21 and the ring supporting members 23 to assist in maintaining a relatively low bearing temperature.

In a copending application, Serial No. 176,772, filed June 25, 1917, I disclosed a single metal ring between the rubber bearing members 20 and 21. While that construction is very good, I have found that I can reduce the heating effect to a minimum by providing a plurality of my present rings 23 having their flanges arranged to engage each other so that any relative sliding movement of the rubber bearing members 20 and 21 takes place by a sliding movement between the metal flanges 22 of the rings 23, thereby reducing the friction and the accompanying heating effect to a minimum. In other words, by means of my present arrangement, in which I provide two metal rings between two rubber bearing members, I prevent a frictional sliding action between a rubber bearing member and a metal part. To reduce further the bearing temperature, metal or heat resisting material, preferably in the form of rings 25, also may be provided between the bearing flange 19 and the adjacent bearing members 20, as shown in Fig. 4. The pressure exerted upon the bearing members may be regulated by adjusting a lock nut 24 with respect to the base of the curb.

I find also that I am able to use somewhat thinner rubber bearing members 20 and 21, thereby permitting better vulcanization of the said members and rendering a better quality of rubber available for this use.

It is my intention to cover modifications of my invention which come within the spirit and scope of the following claims.

I claim:

1. In a centrifugal extractor, the combination of a spindle bearing bushing having a laterally extending flange, a resilient bearing member engaging said flange to take up gyratory motion, and metal means associated with said bearing member and an adjacent element to permit relative movement therebetween to reduce the amount of friction.

2. In a centrifugal extractor, the combination of a resilient spindle bearing bushing having a laterally extending flange, a bearing member engaging said flange to take up gyratory motion, and metal means associated with said bearing member and an adjacent element to permit relative movement therebetween to reduce the amount of friction.

3. In a centrifugal extractor, the combination of a spindle bearing bushing having a laterally extending flange, and a set of bearing members on each side of said flange to take up gyratory motion, each of said sets including a plurality of members, and a plurality of relatively movable members having low frictional resistance spacing said members from each other.

4. In a centrifugal extractor, the combination of a spindle bearing bushing having a laterally extending flange, and a set of bearing members on each side of said flange to take up gyratory motion, each of said sets including a plurality of members, and a plurality of members having low frictional resistance spacing said members from each other and from said bearing bushing.

5. In a centrifugal extractor, the combination of a spindle bearing bushing having a laterally extending flange, a bearing member operatively associated therewith to take up gyratory motion, and means between said flange and said bearing member whereby there may be a relative movement between said parts to reduce the amount of friction.

6. In a centrifugal extractor, the combination of a spindle bearing bushing having a laterally extending flange, and bearing means on each side of said flange, one of said bearing means including a plurality of members and a plurality of relatively movable retaining members interposed therebetween for reducing frictional resistance.

7. In a centrifugal extractor, the combination of a spindle bearing bushing having a laterally extending flange, and bearing means on each side of said flange, one of said bearing means including a plurality of members and a plurality of retaining members interposed therebetween for reducing frictional resistance and for preventing engagement between said first mentioned members and bearing bushing.

8. In a centrifugal extractor, the combination of a spindle bearing bushing having a laterally extending flange, and bearing means on each side of said flange for taking up gyratory motion, said means including annular members, and a plurality of rings having engaging flanges for separating said annular members to reduce friction between the parts.

9. In a centrifugal extractor, the combination of a spindle bearing bushing having a laterally extending flange, and bearing means on each side of said flange for taking up gyratory motion, said means including annular members, and a plurality of rings having engaging flanges for separating said annular members to reduce friction between the parts and being spaced from the bearing bushing to permit circulation of air therebetween.

10. In a centrifugal extractor, the combination of a spindle bearing bushing having a laterally extending flange, bearing means on each side of said flange for taking up gyratory motion, one of said bearing means including a plurality of members and other means therebetween, and means between said flange and each of the adjacent bearing members for reducing frictional resistances.

Signed at Chicago, Illinois, this 25th day of October, 1917.

WILLIAM BARTHOLOMEW.

Witnesses:
J. W. GRIFFEN,
J. E. HOERMANN.